US007756538B2

(12) United States Patent
Bonta et al.

(10) Patent No.: US 7,756,538 B2
(45) Date of Patent: *Jul. 13, 2010

(54) WIDE AREA NETWORK HANDSET ASSISTED CONTENT DELIVERY SYSTEM AND METHOD OF USING SAME

(75) Inventors: Jeffrey D. Bonta, Arlington Heights, IL (US); Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 1121 days.

This patent is subject to a terminal disclaimer.

(21) Appl. No.: 11/269,930

(22) Filed: Nov. 9, 2005

(65) Prior Publication Data

US 2007/0105496 A1    May 10, 2007

(51) Int. Cl.
*H04B 7/00* (2006.01)
(52) U.S. Cl. .................. 455/517; 455/518; 455/412.1; 455/417; 455/420; 455/425; 455/445; 455/15; 455/41.2; 370/328; 370/338
(58) Field of Classification Search ............... 455/517, 455/518, 412.1, 412.2, 414.1, 417, 420, 425, 455/426.1, 445, 450, 456.1–456.6, 3.03, 455/3.05, 9, 15, 41.2; 370/328, 338
See application file for complete search history.

(56) References Cited

U.S. PATENT DOCUMENTS

| 6,839,337 | B2 * | 1/2005 | Newberg et al. ............ 370/338 |
| 7,330,483 | B1 * | 2/2008 | Peters et al. ................ 370/466 |
| 7,546,299 | B2 | 6/2009 | Benco et al. |
| 7,584,244 | B2 * | 9/2009 | Forstadius .................. 709/203 |
| 2004/0044774 | A1 | 3/2004 | Mangalik et al. |
| 2004/0198469 | A1 * | 10/2004 | Kurokawa ................... 455/574 |
| 2004/0203617 | A1 | 10/2004 | Knauerhase et al. |
| 2004/0248594 | A1 * | 12/2004 | Wren, III .................... 455/465 |
| 2005/0170843 | A1 | 8/2005 | Billhartz et al. |
| 2005/0243756 | A1 * | 11/2005 | Cleveland et al. .......... 370/328 |
| 2006/0193292 | A1 * | 8/2006 | Bansal et al. ............... 370/331 |

(Continued)

OTHER PUBLICATIONS

International Search Report and Written Opinion—PCT/US06/41144 mailed Sep. 28, 2007—6 pages.

(Continued)

*Primary Examiner*—Matthew D Anderson
*Assistant Examiner*—Shaima Q Aminzay
(74) *Attorney, Agent, or Firm*—Randi L. Karpinia

(57) ABSTRACT

A wide area network assisted multimedia content delivery system (200) includes a first wide area network handset (205) and a second wide area network handset (207) having one or more transceivers (208) for exchanging information over the wide band network as well as multimedia information via an ad hoc communication. A wide area base unit (201) is used for communicating with the first wide area network handset (205) and second wide area network handset (207) where a content distribution broker (203) associated with the wide area base unit (201) is used for brokering multimedia content (audio, video and text data) between the first wide area network handset (205) and the second wide area network handset (207). The transceiver (208) operates to exchange multimedia content in an ad hoc communication directly between the first wide area network handset (205) and second wide area network handset (207) when within a predetermined proximity.

23 Claims, 5 Drawing Sheets

U.S. PATENT DOCUMENTS

2007/0250194 A1  10/2007  Rhoads et al.

OTHER PUBLICATIONS

PCT/US2006/041144, PCT Preliminary Report on Patentability, mailed May 22, 2008, 6 pages.

USPTO, Office Action, Non-Final Rejection, U.S. Appl. No. 11/531,549, May 7, 2009, 19 pages.

USPTO, Office Action, Final Rejection, U.S. Appl. No. 11/531,549, Nov. 27, 2009, 15 pages.

* cited by examiner

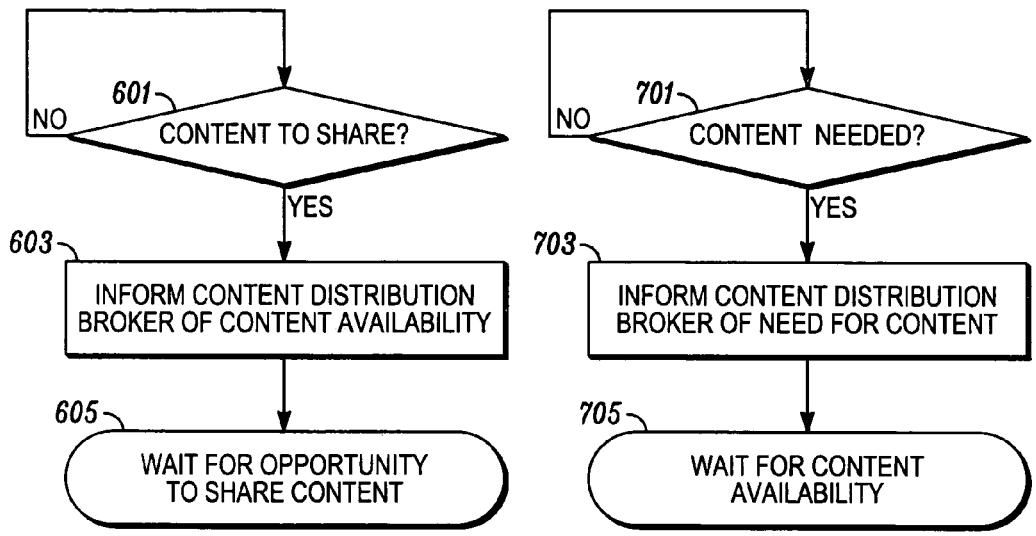
*FIG. 6*   *FIG. 7*
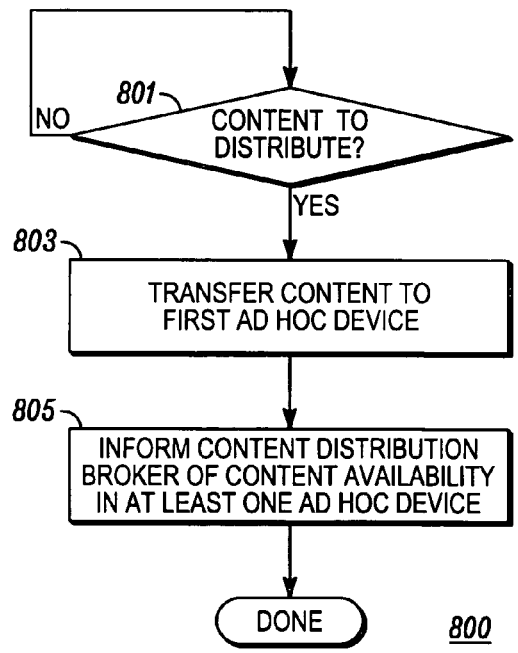
*FIG. 8*

WIDE AREA NETWORK HANDSET ASSISTED CONTENT DELIVERY SYSTEM AND METHOD OF USING SAME

FIELD OF THE INVENTION

The present invention relates generally to delivery of music, text or other content based data through peer-to-peer communication using a second transceiver located within a cellular telephone handset.

BACKGROUND

Internet based peer-to-peer file sharing has been known for many years particularly as used for sharing music. Those skilled in the art will recognize the name NAPSTER as an online music service that used peer-to-peer music sharing amongst users. NAPSTER made a major impact on how people, especially younger people and students, used the Internet. Its technology allowed music fans to easily share MP3 (MPEG-1 Audio Layer-3) format song files between computers.

Prior art FIG. 1 illustrates an Internet-based peer-to-peer data sharing system 100 where a central directory service 101 is connected to all file sharing computers 105, 107 and 109 via the Internet 103. In operation, the central directory service 101 maintains a list of data files and their location which are available for sharing. If computer 105 were to contact the central directory service 101 with a request for specific data, the central directory service would search its database and direct the computer 105 to a data location if the data requested is available. For example, if the data were available on computer 107, then computer 105 would contact computer 107 via the Internet to request access to the desired data.

The disadvantage of using this type of service is that it is Internet based and is therefore dependent on availability of file sharing computers with fixed connectivity to the Internet. If a computer is not connected to the Internet, its files cannot be shared. Moreover, the Internet is a physical communication network that provides near ubiquitous access for the file sharing computers. So once connected, file sharing can occur between designated computers virtually anywhere in the industrialized world. No provision is made for file sharing devices that form short-range wireless communication networks, that have the ability to move away from or move within range of the communication network, and that can only transfer content when both the source and destination file sharing devices are within the same short-range communication network.

Thus, the need exists to provide a system and method for sharing content-based data such as music or text without the necessity of an Internet connection.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 6 is a flow chart diagram illustrating communication between a cellular handset and the content distribution broker where the cellular handset indicates that it has content availability.

FIG. 7 is a flow chart diagram illustrating communication between a cellular handset and the content distribution broker where the cellular handset indicates that it desires specific content.

FIG. 8 is a flow chart diagram illustrating the transfer of multimedia content between a fixed network application in the cellular network and a cellular handset and subsequent communication to the content distribution broker of content availability in the cellular handset.

Figure 1:
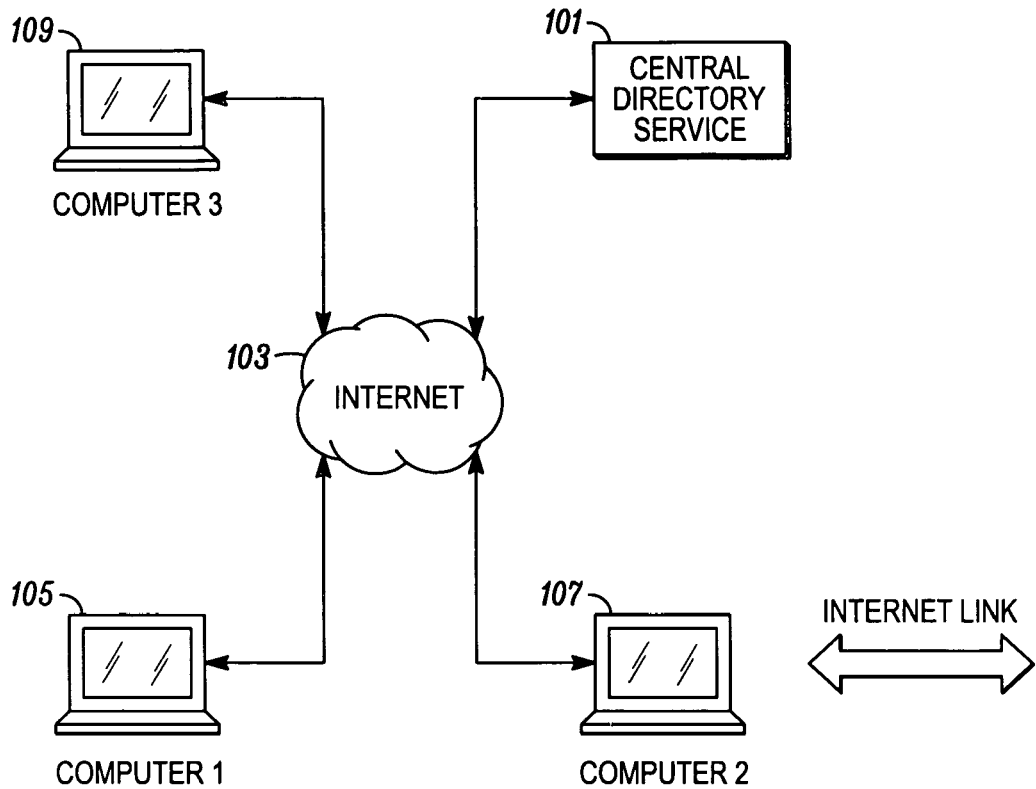
FIG. 1 is a prior art block diagram illustrating operation of Internet based peer-to-peer file sharing.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a cellular assisted content delivery system and method of using same. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a cellular assisted content delivery system as described herein. The non-processor circuits may include, but are not limited to, a radio receiver, a radio transmitter, signal drivers, clock circuits, power source circuits, and user input devices. As such, these functions may be interpreted as steps of a method to perform cellular assisted content delivery. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 2:
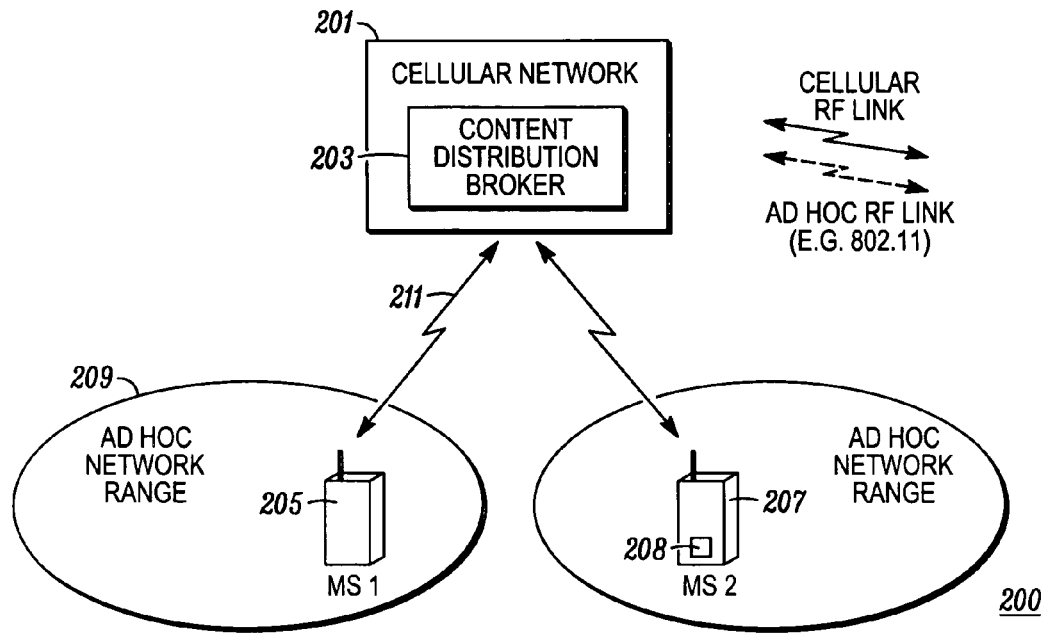
FIG. 2 is a block diagram illustrating a wireless connection of two cellular handsets to a cellular network using a content distribution broker.

FIG. 2 is a block diagram illustrating a wireless connection of two wide area handsets in a typical wide area communications system 200 using a content distribution broker 203 in accordance with an embodiment of the invention. Although the invention is described in a manner using a cellular telephone system, those skilled in the art will recognize that the invention may be implemented using any wide area communications system capable of exchanging multimedia content and other data. Such wide area communications include but are not limited to second generation (2G/2.5G) systems like the Global System for Mobile Communications (GSM), Code Division Multiple Access (CDMA) and Tme Division Multiple Access (TDMA) as well as improved third generation (3G) systems such as Enhanced Data Rates for Global Evolution (EDGE), Wideband CDMA (W-CDMA) and CDMA 2000.

The cellular network 201 is associated with the content distribution broker 203. The content distribution broker is a computer which stores a database of music, text or other electronic data (hereinafter "multimedia content") that is available for exchange and sharing by one or more of the cellular handsets in the network. The content distribution broker works to "broker" information, acting to notify handsets with sharable information with those which are in need of information. Each cellular handset 205, 207 can communicate through the cellular network 201 and also includes a second transceiver that works to provide ad hoc peer-to-peer communication. This communication may use a Bluetooth, an Institute of Electrical and Electronics Engineers (IEEE 802.11, IEEE 802.16 etc.), WiFi, or wide area network standard. It will also be evident to those skilled in the art that each cellular handset includes at least one radio frequency (RF) transceiver (208) capable of operating on multiple frequency bands. A software defined radio transceiver (SDR) may also be used to provide simultaneous communications on multiple frequency bands using only one transceiver.

Figure 3:
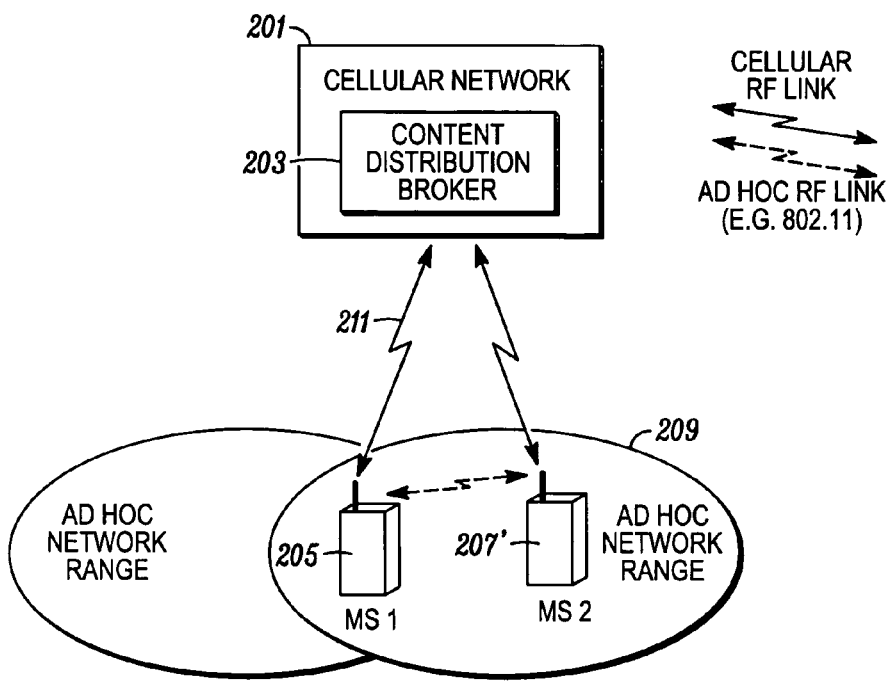
FIG. 3 is a block diagram illustrating an ad hoc wireless link between the two cellular handsets depicted in FIG. 2.

FIG. 3 is a block diagram illustrating the cellular communications system as in FIG. 2, where a wireless ad hoc connection is established between two cellular handsets after notification by a content distribution broker. For example, when the cellular handset 207' moves within the ad hoc network range 209, an ad hoc link is established where content may be exchanged between the cellular handset 205 and cellular handset 207'. As seen in FIG. 3, the second transceiver that is operable within the cellular handset 207 communicates with the second transceiver operable within the cellular handset 205 only when within a range identified by an ad hoc network range 209. When cellular handsets or other devices in the network have content to share, they can notify the content distribution broker 203 through a cellular radio frequency (RF) channel 211 that they have this information to share. When other handsets are desirous of finding information, these requests can also be stored at the content distribution broker 203. When the content information broker 203 determines that there is a match and/or correlation between information requested and information available, the cellular handset which requested information is notified of the Internet protocol (IP) address of the cellular handset with information available. This notification is transmitted through the cellular RF channel 211.

This information will thereafter be exchanged when both cellular handsets come into proximity of one another such as within the ad hoc network range 209. Content distribution broker 203 periodically queries cellular network 201 for location information concerning cellular handsets 205 and 207. Based on the determination that cellular handsets 205 and 207 are within ad hoc network range of each other, the content distribution broker 203 will notify cellular handsets 205 and 207 that they should activate their second transceiver (if not already active). This allows both handsets to identify each other using an ad hoc networking protocol such as an Ad-hoc On-demand Distance Vector (AODV). Thus, an ad hoc network is established for a content transfer between cellular handset 205 and 207. This notification is transmitted via a cellular radio frequency (RF) channel 211 which may be a dedicated massaging channel or the like.

Figure 4:
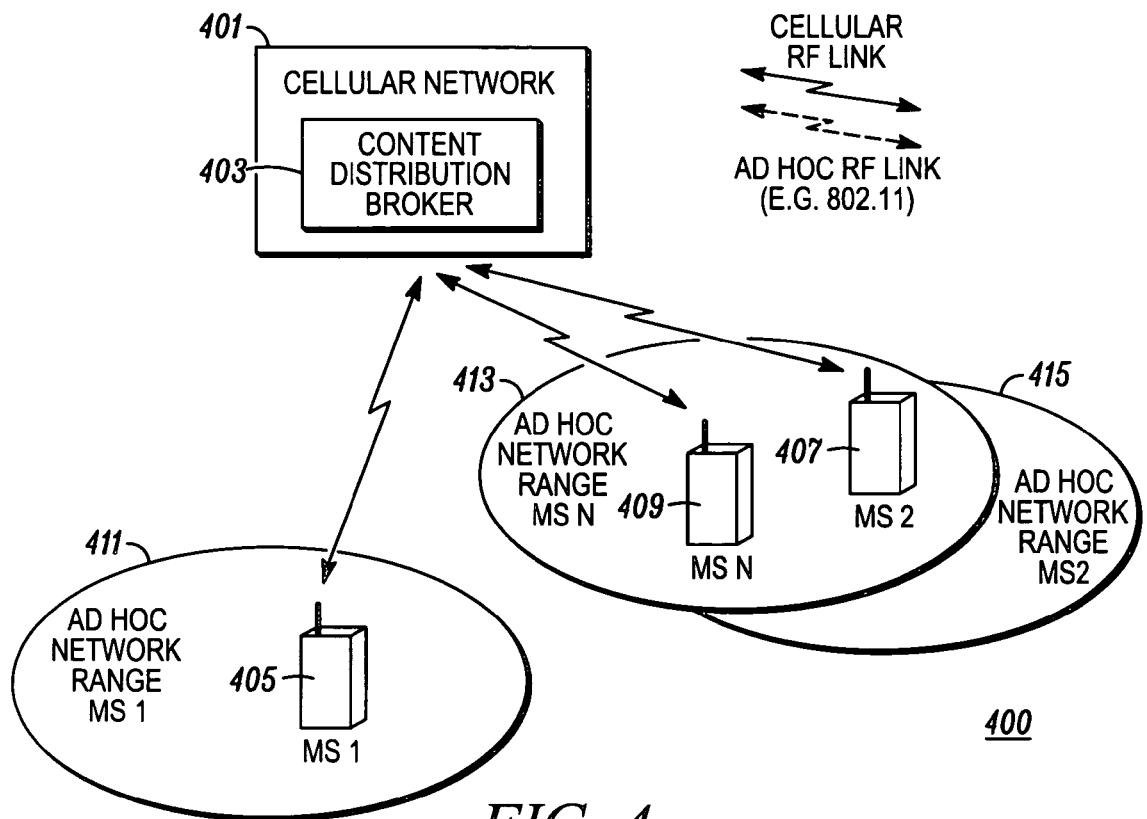
FIG. 4 is a block diagram illustrating a wireless connection of three cellular handsets in a cellular network using a content distribution broker.

FIG. 4 is a block diagram illustrating yet another embodiment of the present invention where a cellular communications system 400 uses a cellular network 401 and a content distribution broker 403 to exchange peer-to-peer content that is relayed between multiple devices without using the cellular network 401. In this embodiment, cellular handsets 405, 407 and 409 can communicate with one another through the cellular network 401 and each also include a second transceiver that provides ad hoc peer-to-peer communication. Each cellular handset 405, 407, and 409 operates with a second transceiver operable within the cellular handset with an ad hoc network range 411, 413, and 415, respectively. When cellular handsets or other devices in the network have content to share, they can notify the content distributing broker 403 via a cellular RF channel 417 that they have this information to share. When other handsets are desirous of finding information, these requests can also be stored at the content distribution broker 403. When the content information broker determines that there is a match or correlation between information requested and information available, the cellular handset which requested information is notified of the IP (Internet Protocol) address of the cellular handset with information available. This notification is transmitted via a cellular RF channel 417. This information will be exchanged when the ad hoc network range 411, 413, and 415 overlap to enable cellular handsets 405 and 407 to establish a wireless ad hoc connection via cellular handset 409.

Content distribution broker 403 periodically queries cellular network 401 for location information concerning cellular handsets 405 and 407. The content distribution broker 403 also queries the cellular network 401 for the location of other ad hoc capable cellular handsets that are within proximity of cellular handsets 405 and 407. Based on the determination that cellular handsets 405 and 407 are either within ad hoc network range of each other or that cellular handset 409 is within ad hoc network range of both cellular handset 405 and 407, the content distribution broker 403 will notify cellular handsets 405, 407, and 409 that they should activate their second transceiver (if not already active), discover each other using an ad hoc networking protocol such as AODV, and establish an ad hoc network for a content transfer between cellular handset 405 and 407. This notification is transmitted via a cellular RF channel 417 such as a dedicated massaging channel or the like.

In yet another embodiment of the invention, in order to provide a mechanism for the cellular service network 401 and the content distribution broker 403 to charge for the service of facilitating the content transfer, each cellular handset can store the number of bytes of data that were transmitted and received. The service provider and broker can charge or credit users of the service as appropriate. Credit may be provided to the cellular handset which performs relays as an incentive to encourage participation in the ad hoc network as described herein.

Figure 5:
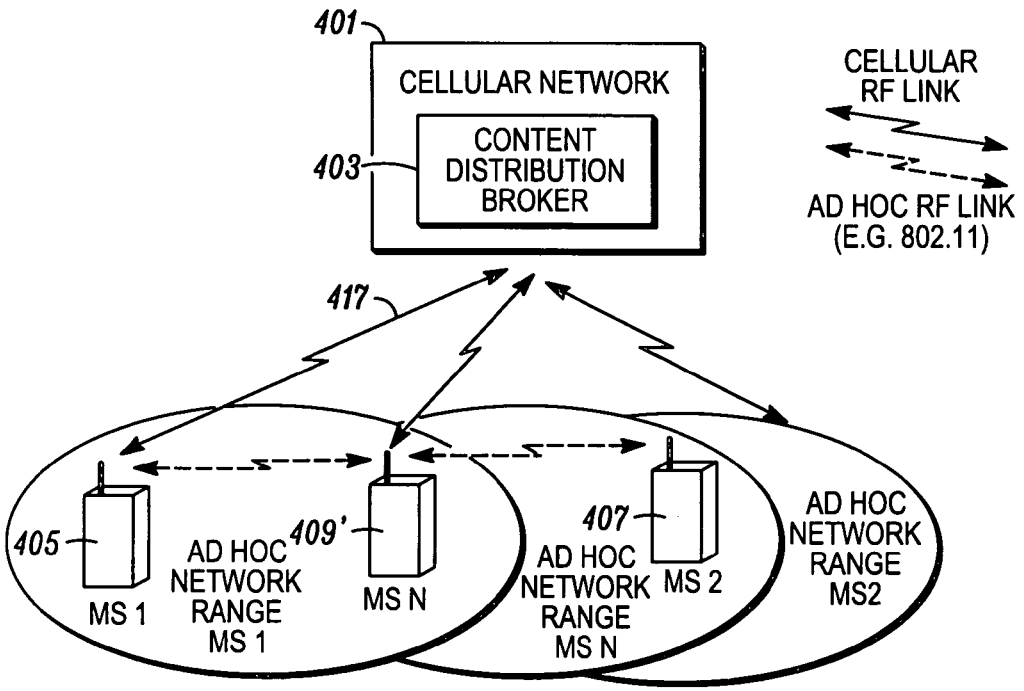
FIG. 5 is a block diagram illustrating an ad hoc wireless link between the three cellular handsets shown in FIG. 4 where the peer-to-peer sharing of data is exchanged using one cellular handset acting as an intermediary.

As seen in FIG. 5, when the cellular handset 409' moves into a position where it can communicate with both cellular handset 405 and cellular handset 407, an ad hoc network is established. In this embodiment, the cellular handset 409' acts as a bridge or intermediary where an ad hoc communication cannot directly established between cellular handset 405 and cellular handset 407. In this case, content can first be transmitted to the cellular handset 409', where it can then be communicated to cellular handset 405 or cellular handset 407.

In an alternative embodiment, the availability of content to share can be made known to the content distribution broker 403 by a fixed network application contained within cellular network 401. Content may initially be made available to at least one cellular handset 405 by the fixed network application contained within cellular network 401. This content is transferred via a cellular RF channel 417 such as a user data channel. Once the fixed network application knows that at least one cellular handset 405 has the content, the fixed network application will inform the content distribution broker 403 that the content is available in at least one cellular handset 405 and that it should distribute the content to all cellular handsets that are within ad hoc network range of the cellular handsets that already have the content such as cellular handset 405. Content distribution broker 403 periodically queries cellular network 401 for location information concerning cellular handsets 405 and other ad hoc capable cellular handsets that are within proximity of cellular handsets 405 that have not yet received the content. Based on a need to deliver content to cellular handset 407 and based on determining that cellular handsets 405 and 407 are either within ad hoc network range of each other or that cellular handset 409 is within ad hoc network range of both cellular handset 405 and 407, the content distribution broker will notify cellular handsets 405, 407, and 409 that they should activate their second transceiver (if not already active). Handsets 405, 407 and 409 will then detect one another using an ad hoc networking protocol such as AODV, and establish an ad hoc network for a content transfer between cellular handset 405 and 407. This notification is transmitted via a cellular RF channel 417, such as a dedicated paging channel or the like.

FIG. 6 is a flow chart diagram 600 illustrating the process associated with a communication between a cellular handset and the content distribution broker where the cellular handset indicates that it has content availability. The cellular handset first determines whether it has content to share 601. If not, it will continue to check but, if it does have content, it then informs the content distribution broker 603 through a cellular communication of its content availability. The content information is then stored locally within the cellular handset and the content distribution broker waits 605 for the opportunity to share the content with another user in need of that content.

FIG. 7 is a flow chart diagram 700 illustrating the process associated with a communication between a cellular handset and the content distribution broker where the cellular handset indicates that it is in need of specific content. The cellular handset first determines from the user whether content is needed 701. If not, it continues checking. However, if content is desired, then the content distribution broker is informed through a cellular communication that content is needed 703. The cellular handset waits some period of time 705 for the content distribution broker to inform the cellular handset that that content is available.

FIG. 8 is a flow chart diagram 800 illustrating the distribution of multimedia content to a multitude of handsets. When a fixed network application with the cellular network has content to distribute 801, the fixed network application transfers content to a first cellular handset 803 through a cellular communication channel. Thereafter, the fixed network application in the cellular network informs the content distribution broker of the content availability 805 for distribution to any other ad hoc device and the process is complete 807.

Figure 9:
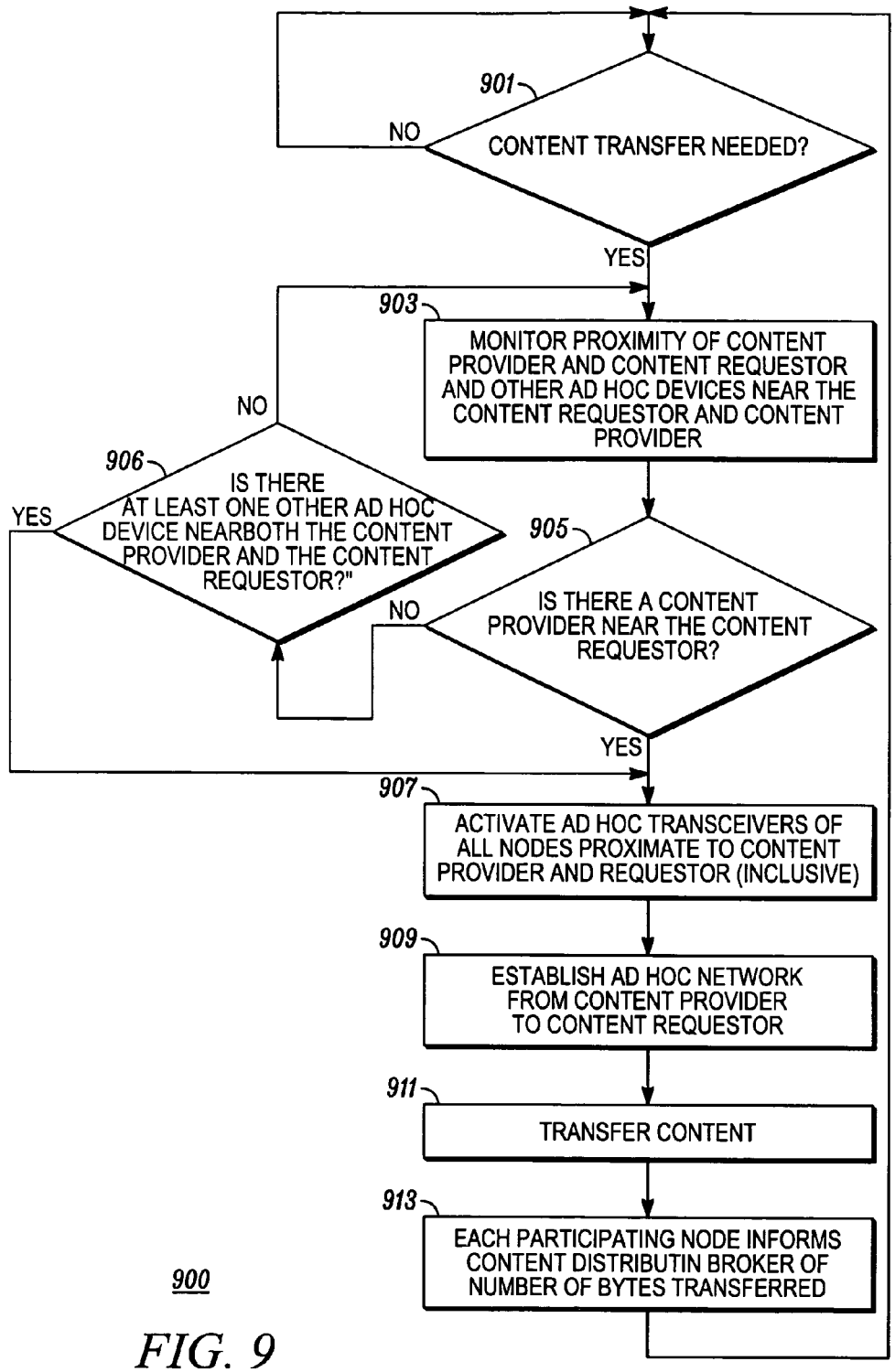
FIG. 9 is a flow chart diagram illustrating communication between a cellular handset desiring content, the content distribution broker and a cellular handset that has content availability.

FIG. 9 is a flow chart diagram 900 illustrating one embodiment of the operation of a content distribution broker which manages communication between a cellular handset desiring content and a cellular handset that has content availability. The process begins when the content distribution broker determines 901 that a content transfer is needed. If it is not needed, the content distribution broker continues checking to see whether there is a match between available content and desired content. If a transfer is needed, the proximity of the content provider and the content requester is determined 903. This process may be done using computer triangulation of radio signal strength (RSSI) signals or through the use of a global positioning system (GPS) located with the cellular handset. This location information is maintained by the cellular network.

It is then determined 905 whether the content provider is in proximity to the content requester. If not, the proximity of the provider and requester is again monitored. A determination is also made whether there is at least one cellular handset or other ad hoc device that that is in proximate range to both the sending and receiving handset 906. If so, then that handset may be used as an intermediary to transfer the multimedia content to the requesting handset. If no handset is within proximity, then the monitoring begins again 903 until the handsets are within range.

If a direct ad hoc communication can be established or an intermediary handset may be used to relay the content, then the ad hoc transceivers of all cellular handsets proximate to the content provider and requester are activated 907. An ad hoc network is then established 909 from the content provider to the content requester, and the content is transferred 911 between these devices. Consequently, each participating cellular node may inform the content distribution broker of the number of bytes that have been transferred 913 and the process begins again.

Thus, the invention describes a communications system operable in a wide area network wherein a content transfer broker is used in connection with a wide area network to inform wide area handsets which are in proximity to one another that content and/or other data may be transferred via an ad hoc RF link between handsets. The invention provides an easy and inexpensive way to transfer content between a content provider handset and a content requester handset without utilizing excessive bandwidth on the wide area network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A multimedia content delivery system comprising:
a first wide area network handset operating to provide an available multimedia content;
a second wide area network handset operating to request a multimedia content;
a wide area base unit for communicating with the first wide area network handset and the second wide area network handset;
at least one processor within the wide area base unit for brokering the multimedia content between the first wide area network handset and the second wide area network handset, wherein the at least one processor operates a database for receiving one or more multimedia content requests and providing an associated content availability notifications,
wherein the brokering comprises matching the available multimedia content with the requested multimedia content, and causing the establishment of an ad hoc network between the first wide area network handset and the second wide area network handset when the first wide area network handset and the second wide area network handset are within a predetermined proximity; and
wherein the first wide area network handset and the second wide area network handset each include at least one transceiver for directly exchanging the multimedia content via the ad hoc network.

2. A multimedia content delivery system as in claim 1, wherein the multimedia content includes at least one of audio data, video data or text data.

3. A multimedia content delivery system as in claim 1, wherein the at least one transceiver is a software defined radio (SDR).

4. A multimedia content delivery system as in claim 1, wherein the at least one transceiver communicates using an ad hoc radio frequency (RF) communication.

5. A multimedia content delivery system as in claim 4, wherein the ad hoc RF communication utilizes a Bluetooth standard.

6. A multimedia content delivery system as in claim 4, wherein the ad hoc RF communication utilizes a WiFi standard.

7. A multimedia content delivery system as in claim 1, wherein the at least one processor communicates periodically with the first wide area network handset and the second wide area network handset regarding their geographical location.

8. A multimedia content delivery system as in claim 1, wherein the at least one processor tracks an approximate position of the first wide area network handset and the second wide area network handset and provides a notification when the first wide area network handset and the second wide area network handset are within range to exchange the at least one multimedia content data.

9. A multimedia content delivery system as in claim 1, further comprising:
one or more other wide area network handsets within the predetermined proximity of the first wide area network handset and the second wide area network handset, each of the one or more other wide area network handsets including at least one transceiver for conveying a message from the first wide area network handset to the second wide area network handsets,
wherein the brokering comprises causing the establishment of an ad hoc network between the one or more other wide area network handsets, the first wide area handset, and the second wide area network handset when the first wide area network handset and the second wide area network handset are not within the predetermined proximity of each other.

10. A cellular communications system for providing information regarding a data content availability to a plurality of subscribers comprising:
a content distribution broker for storing a location of a requested content data, an available content data and an approximate position of each subscriber either requiring or providing the content data;
a first transceiver located within each subscriber for communication with the content distribution broker within the cellular communications system;
a second transceiver located within each subscriber for providing an ad hoc communication with at least one other subscriber; and
wherein the content distribution broker operates to cause the establishment of an ad hoc network between a requesting subscriber requesting a multimedia content with a providing subscriber having the requested multimedia content when the requesting subscriber and the providing subscriber are within a predetermined range of each other for exchanging the multimedia content data using the second transceiver, and to further notify the requesting subscriber and the providing subscriber of a match between the requested multimedia content and the available multimedia content.

11. A cellular telephone communications system as in claim 10, wherein the first transceiver operates to communicate using a cellular communication protocol.

12. A cellular telephone communications system as in claim 10, wherein the second transceiver operates to communicate directly with each subscriber.

13. A cellular telephone communication system as in claim 10, wherein the second transceiver operates using a Bluetooth standard.

14. A cellular telephone communications system as in claim 10, wherein the second transceiver operates using a WiFi standard.

15. A cellular telephone communications system as in claim 10, further including one or more intermediate subscribers within the predetermined range of the requesting and the providing subscriber,
wherein the content distribution broker operates to cause the establishment of an ad hoc network between the one or more intermediate subscribers, the requesting subscriber, and the providing subscriber when the requesting subscriber and the providing subscriber are not within the predetermined range, for conveying the multimedia content data between the requesting subscriber and the providing subscriber through the one or more intermediate subscribers.

16. A cellular telephone communications system as in claim 10, wherein the content distribution broker further acts to store the location of the plurality of subscribers that seek to exchange multimedia content on a periodic basis.

17. A method for providing cellular assisted content delivery at a cellular telephone network site offering multimedia content brokerage services comprising:
- reporting to a cellular network site by a first subscriber that a multimedia content is available to be shared;
- reporting to the cellular network site by a second subscriber that the second subscriber desires to receive the multimedia content;
- matching the available multimedia content with the desired multimedia content;
- storing an approximate location of the first subscriber and the second subscriber; and
- causing the establishment of an ad hoc network between the first subscriber and the second subscriber and notifying the first subscriber and the second subscriber that the multimedia content is available for exchange via the ad hoc network when the first subscriber and second subscriber are in a predetermined range of one another.

18. A method for providing cellular assisted content delivery as in claim 17, further including the step of:
- including a first transceiver and a second transceiver in each subscriber.

19. A method for providing a cellular assisted content delivery as in claim 18, wherein the first transceiver operates to communicate with a cellular network site.

20. A method for providing a cellular assisted content delivery as in claim 18, wherein the second transceiver operates to communicate directly with another subscriber.

21. A method for providing a cellular assisted content delivery as in claim 18, wherein the second transceiver utilizes one from a group of a Bluetooth, a WiFi or a wide area network standard.

22. A method for providing a cellular assisted content delivery as in claim 17, further including the step of:
- causing the establishment of an ad hoc network between the first subscriber, the second subscriber, and at least one intermediate subscriber, wherein the intermediate subscriber is within the predetermined range of the first subscriber and the second subscriber, when the first subscriber and the second subscriber are not within the predetermined range; and
- exchanging the multimedia content between the first subscriber and the second subscriber through the at least one intermediate subscriber.

23. A method for providing a cellular assisted content delivery as in claim 17, wherein the approximate location of the first subscriber and the second subscriber are stored on a periodic basis.

* * * * *

UNITED STATES PATENT AND TRADEMARK OFFICE
CERTIFICATE OF CORRECTION

PATENT NO. : 7,756,538 B2  
APPLICATION NO. : 11/269930  
DATED : July 13, 2010  
INVENTOR(S) : Bonta et al.

Page 1 of 2

It is certified that error appears in the above-identified patent and that said Letters Patent is hereby corrected as shown below:

1. On the Face Page, In the Figure, for Tag "906", in Line 3, delete "NEARBOTH" and insert -- NEAR BOTH --, therefor.

2. On the Face Page, In the Figure, for Tag "913", in Line 2, delete "DISTRIBUTIN" and insert -- DISTRIBUTION --, therefor.

IN THE DRAWINGS

3. In Fig. 9, Sheet 5 of 5, for Tag "906", in Line 3, delete "NEARBOTH" and insert -- NEAR BOTH --, therefor.

4. In Fig. 9, Sheet 5 of 5, for Tag "913", in Line 2, delete "DISTRIBUTIN" and insert -- DISTRIBUTION --, therefor.

IN THE SPECIFICATION

5. In Column 3, Line 32, delete "Tme" and insert -- Time --, therefor.

6. In Column 4, Line 29, delete "massaging" and insert -- messaging --, therefor.

7. In Column 5, Line 5, delete "massaging" and insert -- messaging --, therefor.

IN THE CLAIMS

8. In Column 7, Line 33, In Claim 1, delete "notifications," and insert -- notification, --, therefor.

9. In Column 8, Line 12, in Claim 9, delete "handsets," and insert -- handset, --, therefor.

Signed and Sealed this  
Second Day of April, 2013

Teresa Stanek Rea  
*Acting Director of the United States Patent and Trademark Office*

10. In Column 8, Line 52, in Claim 13, delete "communication" and insert -- communications --, therefor.